United States Patent [19]

Telis et al.

[11] Patent Number: 4,506,143
[45] Date of Patent: Mar. 19, 1985

[54] AUTOMATIC TEMPERATURE CONTROL DEVICE

[75] Inventors: Alexandr I. Telis; Pavel P. Epishin; Viktor I. Korzhov; Gennady A. Makarov; Iosif Y. Kotlyarenko, all of Odessa; Nikolai V. Grischenko, Kirovogradskaya, all of U.S.S.R.

[73] Assignee: Ukrainsky Nauchno-Issledovatelsky Institut Stankov I Instrumentov, Odessa, U.S.S.R.

[21] Appl. No.: 361,915
[22] PCT Filed: Jul. 31, 1980
[86] PCT No.: PCT/SU80/00127
§ 371 Date: Mar. 15, 1982
§ 102(e) Date: Mar. 15, 1982
[87] PCT Pub. No.: WO82/00534
PCT Pub. Date: Feb. 18, 1982
[51] Int. Cl.³ .............................................. H05B 1/02
[52] U.S. Cl. ....................................... 219/497; 219/501; 219/490; 219/508; 340/650
[58] Field of Search ............... 219/497, 501, 508, 505, 219/494, 490, 441; 340/650

[56] References Cited

U.S. PATENT DOCUMENTS

| 3,973,184 | 8/1976 | Baber | 324/51 |
| 4,115,860 | 9/1978 | Atwater | 364/492 |
| 4,320,285 | 3/1982 | Koether | 219/497 |
| 4,322,594 | 3/1982 | Brisson | 219/497 |
| 4,333,004 | 6/1982 | Forgue et al. | 219/497 |

FOREIGN PATENT DOCUMENTS

| 1500876 | 11/1967 | France . |
| 2330055 | 5/1977 | France . |
| 394763 | 1/1974 | U.S.S.R. . |
| 941959 | 7/1982 | U.S.S.R. . |
| 960758 | 9/1982 | U.S.S.R. . |
| 960763 | 9/1982 | U.S.S.R. . |

OTHER PUBLICATIONS

Shteinberg et al. "Industrial Automatic Regulators", 1973, pp. 6-7 (in Russian & English Translation).
Skarzhepa et al. "Thyristor Automatic Devices", 1974, pp. 101-105 (in Russian & English Translation).
Ilynskaya "Fire-Safety Automatic Elements", 1969, p. 66 (in Russian & English Translation).

Primary Examiner—M. H. Paschall
Attorney, Agent, or Firm—Lilling & Greenspan

[57] ABSTRACT

An automatic temperature control device includes a series-connected temperature setter, a comparison unit whose second input is connected to an actual temperature transducer of the controlled entity, a deviation signal amplifier, and a regulating unit. The device also includes a unit used to check the circuit of the transducer for continuity, said unit being connected to the output of the latter, and an electronic switch whose control input is connected to the output of the check unit to apply to the input of the actuator a periodic pulse sequence generated while the circuit of the transducer is open.

5 Claims, 9 Drawing Figures

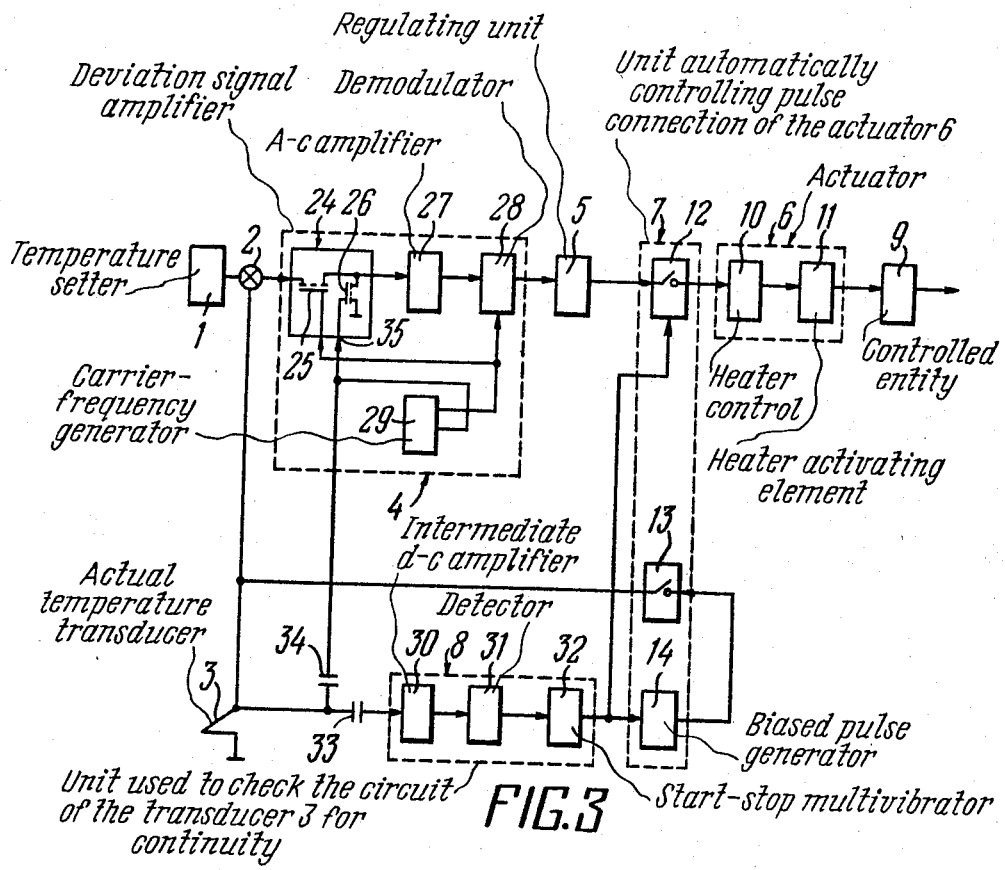
FIG.3
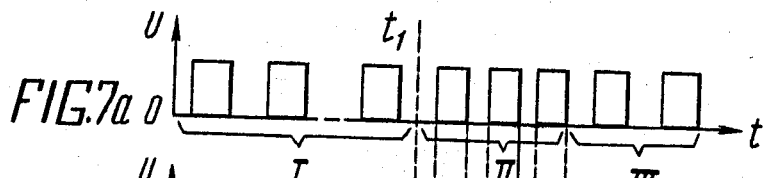
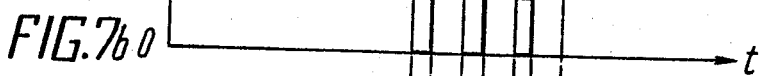
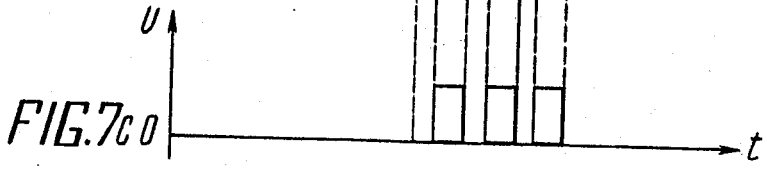

AUTOMATIC TEMPERATURE CONTROL DEVICE

BACKGROUND OF THE INVENTION

1. Field of the Invention

The invention relates to automatic parametric control facilities and, in particular, to an automatic temperature control therefor.

2. Description of the Prior Art

Known in the art is an automatic temperature control method comprising the steps of furnishing a deviation signal proportional to an algebraic difference between predetermined and actual temperatures of a controlled entity and a control signal functionally dependent on the deviation signal and affecting an actuator in the direction of elimination of the existing deviation of the actual temperature from the predetermined temperature, another step being a continuity check of a controlled entity actual temperature transducer circuit.

A known automatic temperature control device accomplishing the prior art method comprises such series-connected components as a controlled entity temperature setter, a comparison unit whose second input is connected to the controlled entity actual temperature transducer, a deviation signal amplifier and a control unit furnishing a signal functionally dependent on a deviation signal, the output of said unit being electrically coupled to the input of an additional unit. The foregoing device also includes a transducer circuit continuity check unit connected to the output of the transducer (cf. A. I. Telis and G. A. Makarov "Temperature Control of Heating Zones of Plastic Processors," 1976 NIIMASH publication, Series C-4, Foundry Machinery Industry, Moscow, pp. 36–38, in Russian).

The known device is designed to automatically control the temperature of heating zones of physical cylinders of plastic pressure-casting machines.

An output element of the actuator is an electric heater arranged on the outside of the cylinder, while the transducer is a thermocouple installed in the body of the physical cylinder of the casting machine.

The electric heater is designed to heat and melt the processed material, the essential requirement being that the temperature within heating zones must be maintained to a high accuracy to obtain quality items.

Such a requirement is necessitated by the fact that a temperature rise over the predetermined value impairs mechanical characteristics of plastics, increases viscosity of the processed material, and a required casting pressure. Internal stresses may, therefore, arise in fabricated parts. A temperature rise over the predetermined value also results in overheating and decomposition of plastics. Furthermore, a higher casting temperature increases a finished item cooling time and reduces operating efficiency of the machine.

It is of particular importance to maintain the temperature which specified limits in processing polyamides and quite a number of special materials characterized by a narrow temperature range in solid-liquid transition. In such instances thermal control must be accurate to +2°.

In the known device an open transducer circuit results in emergency conditions which arise due to the fact that the control unit furnishes at its output a control signal which may take on a random value (from a maximum to a zero level), a disadvantage leading to impermissible heating or cooling of plastics within a physical cylinder of a pressure-casting machine during a production process.

In processing thermosetting plastics the cooling due to an open transducer circuit may cause irreversible hardening of the processed plastic within the cylinder, a limitation increasing downtime and making troubleshooting a time-consuming operation.

In the known device the transducer circuit continuity check unit merely provides indication of an open circuit to attract the operator's attention.

To exclude emergency conditions while repairing the break, it is necessary to turn on stand-by control devices, which is commercially disadvantageous, or to stop the production process, thus decreasing efficiency in fabrication of plastics.

Furthermore, the transducer circuit continuity check units utilized in the known device are characterized by low noise immunity and introduce additional interference in input circuits of the automatic control device, a limitation substantially reducing reliability of a control process.

SUMMARY OF THE INVENTION

The invention resides in providing an automatic temperature control device, wherein emergency conditions due to a transducer circuit break are prevented by including means for maintaining an intermediate temperature in a controlled entity within an operating temperature range when the transducer circuit is broken, positive features thereof being desired efficiency and enhanced reliability of a control process.

The invention resides in an automatic temperature control device which comprises series-connected components as a controlled entity temperture setter, a comparison unit whose second input is connected to a controlled entity actual temperature transducer, a deviation signal amplifier, a regulating unit furnishing a signal functionally dependent on the deviation signal, the output of said regulating unit being electrically coupled to the input of an actuator, and also a transducer circuit continuity check unit connected to the output of the transducer, according to the invention, includes a unit automatically controlling actuator pulse connection in the event of a transducer circuit break, said unit being provided with a main electronic switch having its control input connected to the output of the transducer circuit continuity check unit and used to apply to the actuator unit a periodic pulse sequence fed while the transducer circuit is open and affecting control to maintain an intermediate temperature in the controlled entity within the operating temperature range.

Preferably the transducer circuit continuity check unit represents a periodic pulse sequence generator triggered in the event of a transducer circuit break, while the unit automatically controlling actuator pulse connection in the event of a transducer circuit break incorporates an additional electronic switch whose output has to be connected to a second input of the comparison unit, and a biased pulse generator triggered by the trailing edge of an input pulse and having an input connected to the output of the check unit and an output coupled to the control input of the additional electronic switch, the actuator input being electrically coupled to the output of the regulating unit through said main electronic switch of the automatic control unit.

When the regulating unit represents a pulse-width modulator comprising a sawtooth voltage generator with a constant pulse-repetition period and a threshold element having its first input connected to the output of the deviation signal amplifier and its second input connected to the output of the sawtooth voltage generator, said threshold element preferably has a regulated operating threshold and includes a respective control input connected to the output of the transducer circuit continuity check unit, while the main first electronic switch of the automatic control unit is placed in parallel with the first input of the threshold element of the pulse-width modulator.

When provision is made for a control-action static error compensating unit and the regulating unit represents a pulse-width modulator comprising a sawtooth voltage generator with a constant pulse-repetition period and a threshold element having its first input connected to the output of the deviation signal amplifier, its second input connected to the output of the sawtooth voltage generator, and a third input thereof coupled to the output of said compensating unit whose input is connected to the output of the temperature setter, it is also of advantage that the first electronic switch of the automatic control unit should be placed in parallel with the first input of the threshold element of the pulse-width modulator.

Desirably the unit automatically controlling actuator pulse connection in the event of a transducer circuit break additionally incorporates a periodic pulse sequence generator having its input connected to the output of the check unit and its output coupled to a separate input of the actuator whose other input is, if necessary, electrically connected to the output of the regulating unit through said main electronic switch of the automatic control unit.

Advantageously the periodic pulse sequence generator triggered in the event of a transducer circuit break represents a positive capacitive feedback d-c amplifier composed of two series-connected capacitors whose common connection point has to be connected to the output of the transducer comprising a thermocouple.

When the deviation signal amplifier comprises such series-connected components as a half-wave modulator, an a-c amplifier, a demodulator, and a carrier-frequency generator whose outputs are connected to the control inputs of the demodulator and the modulator having a transistor shunting the input of the a-c amplifier, it is also of advantage that the periodic pulse sequence generator triggered in the event of a transducer circuit break should include such series-connected components as an intermediate d-c amplifier, a detector, and a start-stop multivibrator, while the output of the transducer representing a thermocouple is electrically coupled through separate blocking capacitors to the input of the intermediate d-c amplifier and to the control input of the transistor comprised in the modulator shunting the input of the a-c amplifier.

This provides for uninterrupted operation in the event of a transducer circuit break, an advantage substantially enhancing efficiency and decreasing the number of substandard items. Furthermore, emergency conditions are essentially prevented.

BRIEF DESCRIPTION OF DRAWINGS

The invention will now be described further with reference to a specific embodiment thereof, taken in conjunction with the accompanying drawings, wherein:

FIG. 3 is a block diagram of the automatic temperature control device including preferred embodiments of a deviation signal amplifier and the transducer circuit continuity check unit in compliance with the invention;

FIGS. 7a, b and c depict pulse sequences at the outputs of various components of the device of FIG. 1 according to the invention.

DESCRIPTION OF THE EMBODIMENT

Figure 1:
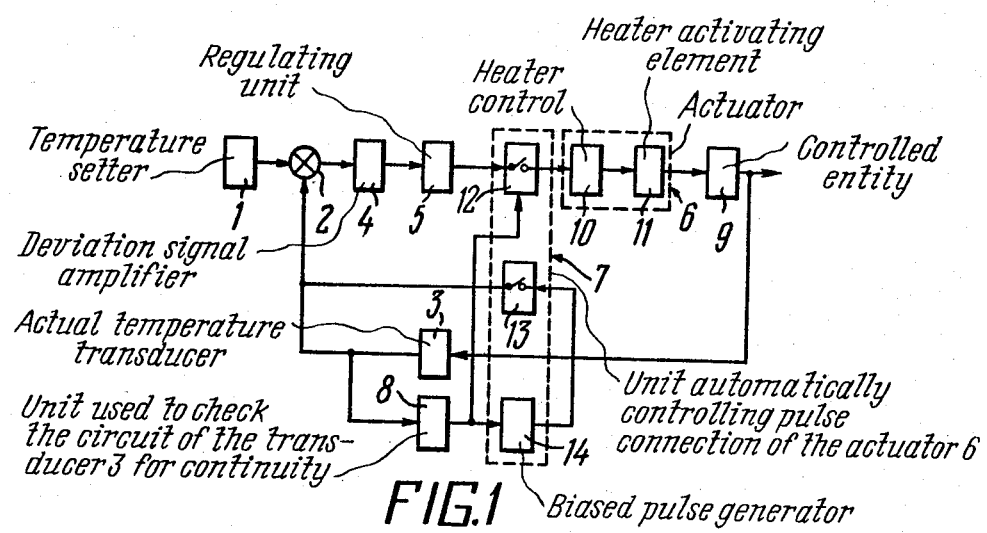
FIG. 1 is a block diagram of an automatic temperature control device according to the invention.

The automatic temperature control device forming the subject of the present invention comprises such series-connected components as a controlled entity temperature setter 1 (FIG. 1), a comparison unit 2 whose second input is connected to a controlled entity actual temperature transducer 3, a deviation signal amplifier 4, and a regulating unit 5.

The output of the regulating unit 5 is electrically coupled to the input of an actuator 6 through a unit 7 which includes a first electronic switch 7 effecting the electrical coupling of the output of the regulating unit 5 to the input of the actuator 6.

The device in compliance with the invention also includes a unit 8 used to check the circuit of the transducer 3 for continuity, said unit being connected to the output of the transducer 3.

A controlled entity 9 may be heating zones of physical cylinders of plastic pressure casting mechines (automatic thermosoftening and thermosetting machines and also half-moulds thereof).

The transducer 3 indicating the actual temperature of the entity 9 may be a thermocouple, a resistance thermometer or a thermistor.

The setter 1 may be an analog or digital unit, an electrical signal at the output of the setter 1 being proportional to the predetermined temperature as read off the transducer 3.

The deviation signal amplifier 4 may represent any standard direct-gain d-c amplifier or d-c amplifier involving intermediate conversion of an amplifier deviation signal into alternating current at a carrier frequency.

The regulating unit 5 may be any multi-purpose regulator furnishing a signal functionally dependent on the deviation signal.

The regulator may be an analog unit (a proportional proportional-integrated or proportional-integrated-differential regulator) or a pulse unit (a pulse-width regulator).

The actuator 6 employs a known circuit incorporating a heater control system 10 and a heater activating element 11 mounted in the controlled entity 9.

The heater activating element 11 may represent a magnetic starter or a thyristor element employing two thyristors oppositely connected in parallel.

In the case of the thyristor element 11 the heater control circuit 10 comprises a biased blocking oscillator.

The unit 8 used to check the circuit of the transducer 3 for continuity is a periodic pulse sequence generator triggered in the event of a transducer circuit break and employing any known bistable circuit.

The device in compliance with the invention comprises the unit 7 automatically controlling pulse connection of the actuator 6 provided with a main electronic switch 12 electrically coupling the output of the regulating unit 5 to the input of the actuator 6, and also an additional or second electronic switch 13 whose output is connected to the second input of the comparison unit 2.

The automatic control unit 7 also includes a biased pulse generator 14 triggered by the trailing edge of an input pulse and having an input connected to the output of the check unit 8 which is also connected to the control input of the first electronic switch 12, and an output connected to the control input of the second electronic switch 13.

The check unit 8 represents a start-stop multivibrator, while the generator 14 also representing a start-stop multivibrator is provided with an input differentiating network and a diode.

An electronic switch 12 employs a sealed-contact reed relay or a field transistor, while an electronic switch 13 is a NOR gate, the normal state of the switch 12 being an open state.

Figure 2:
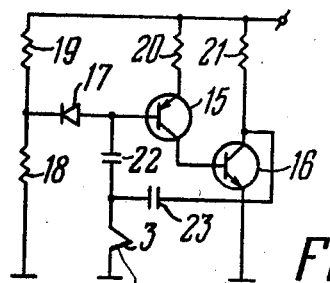
FIG. 2 is a circuit schematic of a transducer circuit continuity check unit according to the invention.

FIG. 2 illustrates the circuit configuration of the check unit 8 representing an d-c amplifier.

The amplifier employs an p-n-p transistor 15, an n-p-n transistor 16, a diode 17, resistors 18, 19, 20, 21 connected in a positive capacitive feedback circuit formed with series-connected capacitors 22 and 23, a common connection point thereof being connected to the output of the transducer 8 comprising a thermocouple.

When the transducer 3 represents a thermocouple characterized by a low level of output signal (tens of microvolts/deg.), a maximum effect is obtained by utilizing the deviation signal amplifier 4 (FIG. 3) representing the d-c amplifier involving intermediate conversion of an input d-c signal into an a-c signal.

The amplifier 4 comprises such series-connected components as a half-wave modulator (the illustrated circuit includes two transistors 25 and 26), an a-c amplifier 27, and a demodulator 28.

The amplifier 4 also includes a carrier-frequency generator 29 whose outputs are connected to the control inputs of the demodulator 28 and the modulator 24.

With such a deviation signal amplifier 4, the check unit 8 representing a periodic pulse sequence generator triggered when the circuit of the transducer 3 is broken contains such series-connected components as an intermediate d-c amplifier 30, a detector 31, and a start-stop multivibrator 32.

The output of the transducer 3 representing a thermocouple is electrically connected through a blocking capacitor 33 to the input of the intermediate d-c amplifier 30 and through a blocking capacitor 34 to a control input 35 of the transistor 26 of the modulator 24 shunting the input of the a-c amplifier 27.

The use a pulse-width modulator 24 as the regulating unit 5 (FIG. 4) in controlling thermal processes permits obtaining a higher regulating accuracy and assures a minimum distortion of line voltage waveforms and minimum electrical interference in operation of the automatic temperature control device.

When use is made of the pulse-width modulator comprising a sawtooth voltage generator 36 with a constant pulse-repetition period and a threshold element 37 having its first input connected to the output of the deviation signal amplifier 4 and its second input connected to the output of the sawtooth voltage generator 36, the threshold element 37 has a regulated operating threshold and includes a control input 38 connected to the output of the unit 8 used to check the circuit of the transducer 3 for continuity.

The main electronic switch 12 of the automatic control unit 12 is connected in parallel with the first input of the threshold element 37 of the pulse-width modulator.

The pulse-width modulator develops at its output a control signal representing a pulse sequence, the duration of each pulse being proportional to the deviation signal over a given quantization period determined by a pulse-repetition period of the sawtooth voltage generator 36.

When the device includes a control-action static error compensating unit 39 (FIG. 5) and the regulating unit 5 represents the pulse-width modulator comprising the sawtooth voltage generator 36 with a constant pulse-repetition period and the threshold element 37 having its first input connected to the output of the deviation signal amplifier 4, its second input connected to the output of the sawtooth voltage generator 36, and the third input thereof coupled to the output of the compensating unit 39, the main electronic switch 12 of the unit 7 is placed in parallel with the first input of the threshold element 37 of the pulse-width modulator.

The input of the control-action static error compensating unit 39 is connected to the output of the temperature setter 1.

When the setter 1 is a digital unit, the compensating unit 39 is a start-connected voltage divider whose control mechanical drive elements are combined with the mechanical elements of the temperature setter 1.

The automatic control unit 7 (FIG. 6) additionally includes a periodic pulse sequence generator 40 having its input connected to the output of the check unit 8 and its output connected to a separate input of the actuator 6.

The other input of the actuator is electrically connected to the output of the regulating unit 5 through the main electronic switch 12 of the automatic control unit 7.

The generator 40 is a start-stop multivibrator operating from an output signal of the check unit 8.

The period and relative duration of the pulse sequence of the generator 40 are set manually so that their effect upon the actuator 6 permits maintaining any intermediate temperature in the entity 9 within the operating temperatures range.

FIG. 7 a depicts a pulse sequence at the output of the electronic switch 12 (FIG. 1):

section I (FIG. 7a) shows normal operation of the device before the circuit of the transducer 3 (FIG. 1) is broken;

section II (FIG. 7a) illustrates a faulty condition following the instant $t_1$ when the circuit of the transducer 3 (FIG. 1) is broken; and section III (FIG. 7a) illustrates a condition after the circuit of the transducer 3 (FIG. 1) is repaired.

FIG. 7b depicts a pulse sequence at the output of the check unit 8 (FIG. 1) at the time the circuit of the transducer 3 is open.

FIG. 7c depicts a pulse sequence at the output of the biased pulse generator 14 (FIG. 1) at the time the circuit of the transducer 3 is open.

The automatic temperature control device forming the subject of the present invention operates as follows.

When the circuit of the transducer 3 is in good condition, the device automatically controls the temperature over the main channel through the closed electronic switch 12.

The generator of the check unit 8 is biased by a control signal derived from the output of the transducer 3 and does not trigger the periodic pulse sequence generator 14. The electronic swith 13 is open, and the switch 12 is closed.

The regulating unit 5 using a pulse-width modulator circuit develops at its output a sequence of width-modulated pulses (section I in FIG. 7a) as a function of a amplified deviation signal at the output of the deviation signal amplifier 4 (FIG. 1) during each quantization period.

While the pulse is present, a zero signal appears at the first input of the electronic switch 12 (a NOR gate), while its output develops a one signal. The thyristors of the actuator 6 are turned on while the pulse is present.

When the transducer circuit is broken at the instant $t_1$ (FIG. 7b), the generator of the check unit 8 (FIG. 1) operates assuming the other stable state and opening the electronic switch 12.

The input of the actuator 6 is no longer controlled.

The pulse sequence generator 14 is triggered simultaneously.

The process is as follows.

While the pulse from the generator of the check unit 8 is present, a one signal at the second input of the electronic switch 12 causes the switch 12 to open regardless of the state of the output of the regulating unit 5. The trailing edge of the pulse (FIG. 7b) coming to the input of the generator 14 (FIG. 1) is differentiated by its input circuit and triggers the generator 14.

As a pulse (FIG. 7c) appears at the output of the generator 14 (FIG. 1), the electronic switch 13 is closed, thereby by-passing the broken circuit of the transducer 3.

The generator of the check unit 8 is biased, thus causing an enabling zero signal to appear at the second input of the electronic switch 12.

While the pulse (FIG. 7c) from the generator 14 (FIG. 1) is present, artificial completion of the input circuit of the deviation signal amplifier 4 (due to bypassing of the broken circuit of the transducer 3) causes the regulating unit 5 to develop at its output a signal (section II of FIG. 7) which, while present, makes the thyristors of the actuator 6 accept a control pulse through the closed switch 12 (FIG. 1).

The entity 9 receives thermal energy whereby its intermediate temperature will be maintained within the operating temperature range.

As the trailing edge of the pulse (FIG. 7c) appears at the output of the generator 14 (FIG. 1), the switch 13 is opened whereby the circuit of the transducer 3 will not be bypassed any longer. As a result, a pulse (FIG. 7b) will appear at the output of the generator of the check unit 8 (FIG. 1).

A one signal appearing at the second input of the electronic switch 12 will open the switch 12 and disconnect the output of the regulating unit 5 from the input of the actuator 6.

The leading edge of the generator of the check unit 8 coming to the input of the generator 14 is differentiated by its inputs circuit but fails to pass through the diode. Thus, the generator 14 will not be triggered.

Thereafter the device will operate in the above manner until the circuit of the transducer 3 is repaired. After the next pulse from the generator 14 ceases, the generator of the check unit 8 is biased by the repaired circuit of the transducer 3. Thus, the next pulse will not be generated.

The device will, then, accomplish automatic control over the main channel through the closed electronic switch 12, and the regulating unit 5 will again develop at its output a sequence of width-modulated pulses (section III of FIG. 7c).

While the circuit of the transducer 3 (FIG. 1) is broken, an additional light-emitting diode placed at the output of the generator 14 provides flickering indication.

Thus, when the circuit of the transducer 3 is broken, the device is automatically transferred to a condition characterized by a constant period-to-pulse duration ratio. In this mode the pulse duration and repetition period may be set by the operator.

Hence, an intermediate temperature in the controlled entity 9 will be maintained within the operating temperature range.

This enhances operational reliability since any noticeable overheating or cooling of plastic in a physical cylinder of a pressure casting machine is essentially prevented and no interruption occurs when the circuit of the transducer 3 is broken, an advantage increasing efficiency and decreasing the number of substandard items. Also, emergency conditions are prevented.

If the transducer 3 is a thermocouple, the use of the circuit of FIG. 2 makes it possible to eliminate spurious signals affecting a control process in the input circuits of the thermocouple and in the input circuits of the regulating unit 5 (FIG. 1) when the transducer 3 performs satisfactorily (without a circuit break).

Furthermore, such connection of the transducer 3 precludes spurious responses of the check unti 8 due to thermal e.m.f.'s of the transducer 3.

In the embodiment illustrated in FIG. 3 a broken thermocouple (an open circuit of the transducer 3) results in that the check unit 8 is triggered by an external sighal from the carrier-frequency generator 29, said signal being fed to the input of the check unit 8 only in the event of a break, an advantage appreciably increasing noise immunity thereof.

Moreover, the circuitry is simplified due to the utilization of means comprised in the deviation signal amplifier 4 for providing a desired external signal.

Noise immunity is also increased in the event of normal operation of the device since an external signal triggering the check unit 8 comes to the input circuits of the device during the carrier half-cycles when the input of the a-c amplifier 27 is shunted by the transistor 26 in the half-wave modulator 24.

Figure 4:
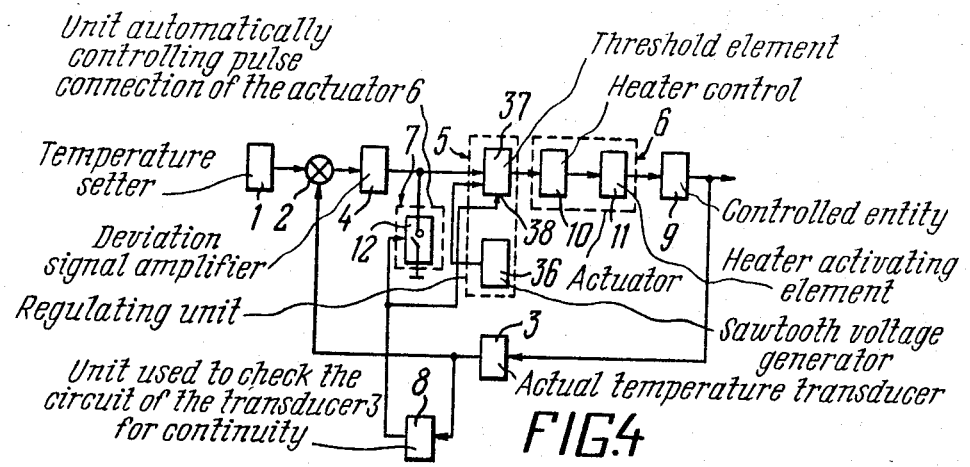
FIG. 4 is a block diagram of the automatic temperature control device with a regulating unit representing a pulse-width modulator according to the invention.

In the embodiment illustrated in FIG. 4 before the circuit of the transducer 3 is broken, the generator of the check unit 8 is in its first stable state, the electronic switch 12 is open, and the threshold element 37 has a response level causing a pulse sequence to appear at the output of the pulse-width modulator, the pulse duration being determined by a deviation signal during a given quantization period.

When the circuit of the transducer 3 is broken, the generator of the check unit 8 assumes the other stable state, thereby closing the electronic switch 12 and setting such a response level of the threshold element 37, which provides for generation of constant-duration pulses during each quantization period under the action of the output signals of the sawtooth voltage generator 36.

The pulse duration may be set manually by the operator by selecting an appropriate response level of the threshold element 37.

After the circuit of the transducer 3 is completed, the generator of the check unit 8 assumes its first stable state, thus ensuring normal operation of the device.

Figure 5:
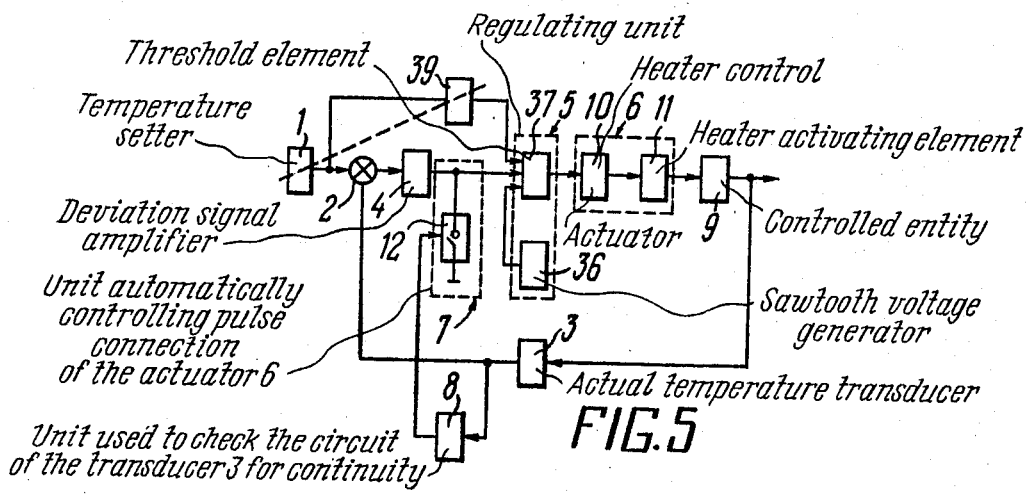
FIG. 5 is a block diagram of the automatic temperature control device incorporating a control-action static error compensating unit and the pulse-width modulator acting as the regulating unit according to the invention.

In the embodiment illustrated in FIG. 5 before the circuit of the transducer 3 is broken, the generator of the check unit 8 is in its first stable state, the electronic switch 12 is open, and the threshold element 37 has a response level causing a pulse sequence to appear at the output of the pulse-width modulator, the pulse duration being determined by a deviation signal during a given quantization period. Thus, there occurs simultaneous compensation of a control-action static error.

When the circuit of the transducer 3 is broken, the generator of the check unit 8 assumes the other stable state, thereby closing the electronic switch 12 and disconnecting the amplifier 4 from the input of the threshold element 37.

Under the action of the output signals of the sawtooth voltage generator 36 and the compensating unit 39 the pulse-width modulator develops at its output a pulse sequence having a constant period-to-pulse duration ratio dependent upon the preset level and the extent of control-action static error compensation.

After the circuit of the transducer 3 is repaired, the generator of the check unit 8 assumes the first stable state, thus ensuring normal operation of the device.

In the circuits shown in FIGS. 4 and 5 when the circuit of the transducer 3 is open, a control pulse is produced due to those components of the device, which perform other functions during normal operation.

Figure 6:
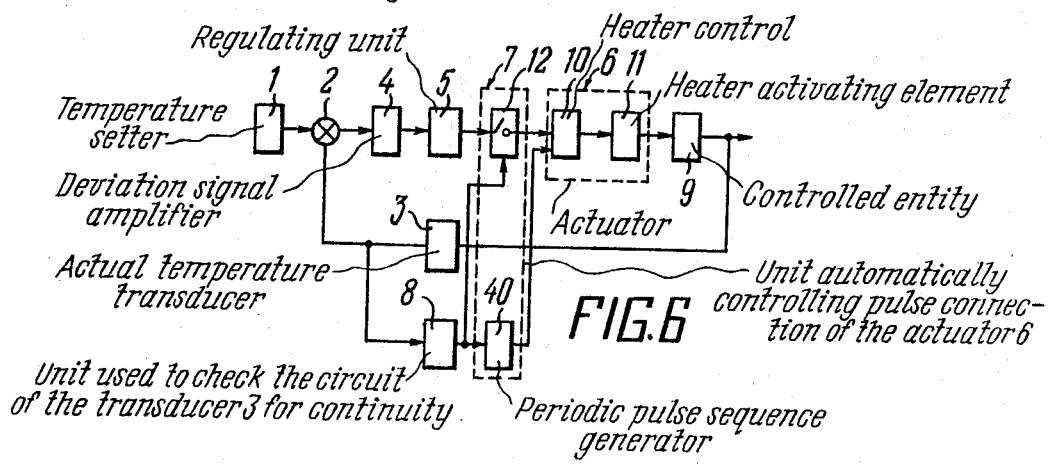
FIG. 6 is a block diagram of the automatic temperature control device including a preferred embodiment of a unit automatically controlling actuator pulse connection in the event of a transducer circuit break according to the invention.

When the circuit of the transducer 3 is in good repair, the device of FIG. 6 automatically controls the temperature over the main channel through the open switch 12.

The generator of the check unit 8 is biased, and the periodic pulse sequence generator 40 is not triggered.

As the circuit of the transducer 3 is broken, the generator of the check unit 8 assumes the other stable state, thereby removing a control pulse from the respective input of the actuator 6 through the switch 12 and, simultaneously, triggering the generator 40 which generates a pulse sequence applied to the other respective input of the unit 6 until the circuit of the transducer 3 is repaired.

The hereinproposed automatic temperature control device therefor may be used for controlling heating zones of physical cylinders and half-moulds of pressure casting machines for processing various plastics.

Besides, the invention may find applications for automatically maintaining temperature in industrial and laboratory resistor furnaces and also in controlling temperature of heat processes in the thermal energy field, as well as in food, electronic and chemical industries.

With a temperature transducer replaced by a suitable appliance, the device forming the subject of the present invention may be used for controlling other physical parameters.

We claim:

1. An automatic temperature control device comprising series-connected components including a temperature setter (1) of a controlled entity (9), a comparison unit (2) whose second input is connected to an actual temperature transducer (3) of the controlled entity (9), a deviation signal amplifier (4), and a regulating unit (5) furnishing a signal functionally dependent on the deviation signal, the output of said unit being electrically coupled to the input of the actuator (6), and also a unit (8) used to check the circuit of the transducer (3) for continuity, a unit (7) automatically controlling pulse connection of the actuator (6) when the circuit of the transducer (3) is open, said unit being provided with a main electronic switch (12) having its control input connected to the output of the unit (8) used to check the circuit of the transducer (3) for continuity, and operating to apply to the input of the actuator (6) a periodic pulse sequence fed while the circuit of the transducer (3) is open and affecting control to maintain an intermediate temperature in the controlled entity (9) within the operating temperature range, said unit (8) used to check the circuit of the transducer (3) for continuity representing a periodic pulse sequence generator triggered when the circuit of the transducer (3) is open, while the unit (7) automatically controlling pulse connection of the actuator (6) when the circuit of the transducer (3) is broken incorporates an additional electronic switch (13) whose output is connected to a second input of the comparison unit (2), and a biased pulse generator (14) triggered by the trailing edge of an input pulse and having an input connected to the output of the check unit (8) and an output coupled to the control input of the additional electronic switch (13), the input of the actuator (6) being electrically coupled to the output of a regulating unit (5) through said main electronic switch (12) of the automatic control unit (7).

2. A device as claimed in claim 1 characterized in that the periodic pulse sequence generator triggered when the circuit of the transducer (3) is open represents a positive capacitive feedback d-c amplifier composed of two series-connected capacitors (22 and 23) whose common connection point is connected to the output of the transducer (3) comprising a thermocouple.

3. A device as claimed in claim 1, characterized in that, with the deviation signal amplifier (4) comprising such series-connected components as a half-wave modulator (24), an a-c amplifier (27), a demodulator (28), a carrier-frequency generator (29) whose outputs are connected to the control inputs of the demodulator (28) and the modulator (24) having a transistor (26) shunting the input of the a-c amplifier (27), the periodic pulse sequence generator triggered when the circuit of the transducer (3) is open includes such series-connected components as an intermediate d-c amplifier (30), a detector (31), and a start-stop multivibrator (32), while the output of the transducer (3) representing a thermocouple is electrically coupled to the input of the intermediate d-c amplifier (30) through separate blocking capacitors (33 and 34) and to the control input (35) of the transistor (26) of the modulator (24) shunting the input of the a-c amplifier (27).

4. An automatic temperature control device comprising series-connected components including a temperature setter (1) of a controlled entity (9), a comparison unit (2) whose second input is connected to an actual temperature transducer (3) of the controlled entity (9), a deviation signal amplifier (4), and a regulating unit (5) furnishing a signal functionally dependent on the deviation signal, the output of said unit being electrically coupled to the input of the actuator (6), and also a unit (8) used to check the circuit of the transducer (3) for continuity, a unit (7) automatically controlling pulse connection of the actuator (6) when the circuit of the transducer (3) is open, said unit being provided with a main electronic switch (12) having its control input connected to the output of the unit (8) used to check the circuit of the transducer (3) for continuity, and operating to apply to the input of the actuator (6) a periodic pulse sequence fed while the circuit of the transducer (3) is open and affecting control to maintain an intermediate temperature in the controlled entity (9) within the operating temperature range, said regulating unit (5) representing a pulse-width modulator comprising a sawtooth voltage generator (36) with a constant pulse-repetition period and a threshold element (37) having its first input connected to the output of the deviation signal amplifier (4) and its second input connected to the output of the sawtooth voltage generator (36), and said threshold element (37) having a regulated operating threshold and includes a respective control input (38) connected to the output of the unit (8) used to check the circuit of the transducer (3) for continuity, while the main electronic switch (12) of the automatic control unit (7) is placed in parallel with the first input of the threshold element (37) of the pulse-width modulator.

5. An automatic temperature control device comprising series-connected components including a temperature setter (1) of a controlled entity (9), a comparison unit (2) whose second input is connected to an actual temperature transducer (3) of the controlled entity (9), a deviation signal amplifier (4), and a regulating unit (5) furnishing a signal functionally dependent on the deviation signal, the output of said unit being electrically coupled to the input of the actuator (6), and also a unit (8) used to check the circuit of the transducer (3) for continuity, a unit (7) automatically controlling pulse connection of the actuator (6) when the circuit of the transducer (3) is open, said unit being provided with a main electronic switch (12) having its control input connected to the output of the unit (8) used to check the circuit of the transducer (3) for continuity, and operating to apply to the input of the actuator (6) a periodic pulse sequence fed while the circuit of the transducer (3) is open and affecting control to maintain an intermediate temperature in the controlled entity (9) within the operating temperature range, with provision being made for a control action static error compensating unit (39) and the regulating unit (5) representing a pulse-width modulator comprising the sawtooth voltage generator (36) with a constant pulse-repetition period and the threshold element (37) having its first input connected to the output of the deviation signal amplifier (4), its second input connected to the output of the sawtooth voltage generator (36), and the third input thereof coupled to the output of the compensating unit (39) whose input is connected to the output of the setter (1), the main electronic switch (12) of the automatic control unit (7) is placed in parallel with the first input of the threshold element (37) of the pulse-width modulator.

* * * * *